United States Patent
Takeuchi et al.

(10) Patent No.: US 10,260,562 B2
(45) Date of Patent: Apr. 16, 2019

(54) INSULATED BEARING AND BEARING COATING METHOD

(71) Applicants: TOCALO CO., LTD, Kobe-shi, Hyogo (JP); NSK LTD., Shinagawa-ku, Tokyo (JP)

(72) Inventors: Junichi Takeuchi, Funabashi (JP); Yuji Okada, Funabashi (JP); Masaya Nagai, Funabashi (JP); Manabu Yamada, Fujisawa (JP); Naozumi Nakata, Fujisawa (JP)

(73) Assignees: TOCALO CO., LTD, Kobe-shi (JP); NSK LTD., Tokyo (JP)

( * ) Notice: Subject to any disclaimer, the term of this patent is extended or adjusted under 35 U.S.C. 154(b) by 0 days.

(21) Appl. No.: 15/539,461

(22) PCT Filed: Dec. 24, 2015

(86) PCT No.: PCT/JP2015/086034
§ 371 (c)(1),
(2) Date: Jun. 23, 2017

(87) PCT Pub. No.: WO2016/104606
PCT Pub. Date: Jun. 30, 2016

(65) Prior Publication Data
US 2017/0356075 A1    Dec. 14, 2017

(30) Foreign Application Priority Data

Dec. 24, 2014 (JP) ................ 2014-259918
Sep. 10, 2015 (JP) ................ 2015-178532

(51) Int. Cl.
*C23C 4/10* (2016.01)
*F16C 33/62* (2006.01)
*F16C 33/64* (2006.01)

(52) U.S. Cl.
CPC .............. *F16C 33/62* (2013.01); *C23C 4/10* (2013.01); *F16C 33/64* (2013.01);
(Continued)

(58) Field of Classification Search
CPC ...... F16C 19/525; F16C 33/586; F16C 33/62; F16C 33/64; F16C 2202/24; F16C 2206/44; F16C 2223/42
(Continued)

(56) References Cited

U.S. PATENT DOCUMENTS 7,097,362 B2 * 8/2006 Inukai ............... F16C 19/52
                                            384/476
8,425,120 B2 * 4/2013 Konno ............... F16C 19/52
                                            384/476
(Continued)

FOREIGN PATENT DOCUMENTS

CN       1706980 A    12/2005
CN     102954114 A     3/2013
(Continued)

OTHER PUBLICATIONS

International Search Report dated Mar. 1, 2016 issued by the International Searching Authority in counterpart International Application No. PCT/JP2015/086034 (PCT/ISA/210/220).
(Continued)

*Primary Examiner* — James Pilkington
(74) *Attorney, Agent, or Firm* — Sughrue Mion, PLLC

(57) ABSTRACT

An insulated bearing includes an outer ring, an inner ring, and a plurality of rolling elements. At least one of the outer ring and an inner ring is made of metal, the plurality of rolling elements are provided between the outer ring and the inner ring, so as to be freely rolled, and at least one of the outer ring and an inner ring is coated with an insulating layer. The insulating layer is formed of a mixture in which
(Continued)

silicon carbide and/or aluminum nitride as an additive are/is dispersed in aluminum oxide as a base matrix. The content of the additive is 1 to 40 mass % with respect to the total amount of the mixture.

5 Claims, 2 Drawing Sheets

(52) U.S. Cl.
CPC .... *C08K 2201/005* (2013.01); *F16C 2202/24* (2013.01); *F16C 2206/44* (2013.01); *F16C 2223/42* (2013.01)

(58) Field of Classification Search
USPC ........................................................ 384/476
See application file for complete search history.

(56) References Cited

U.S. PATENT DOCUMENTS

| | | | |
|---|---|---|---|
| 9,646,737 B2* | 5/2017 | Martin | F16C 33/62 |
| 2002/0112882 A1* | 8/2002 | Hirakawa | H01L 23/49861 |
| | | | 174/256 |
| 2004/0066997 A1* | 4/2004 | Inukai | C23C 4/02 |
| | | | 384/476 |
| 2005/0094910 A1 | 5/2005 | Tsuji et al. | |
| 2009/0130324 A1* | 5/2009 | Shanker | C04B 35/117 |
| | | | 427/450 |
| 2009/0304318 A1 | 12/2009 | Konno et al. | |

FOREIGN PATENT DOCUMENTS

| | | |
|---|---|---|
| JP | 63-169371 A | 7/1988 |
| JP | 2005-133876 A | 5/2005 |
| JP | 2007-147072 A | 6/2007 |
| JP | 2008-50669 A | 3/2008 |
| JP | 5025190 B2 | 9/2012 |
| JP | 2014-185741 A | 10/2014 |

OTHER PUBLICATIONS

Written Opinion dated Mar. 1, 2016 issued by the International Searching Authority in counterpart International Application PCT/JP2015/086034 (PCT/ISA/237).
Communication dated Nov. 5, 2018 issued by the State Intellectual Property Office of P.R. China in Counterpart Chinese Application No. 201580070942.X.

* cited by examiner

INSULATED BEARING AND BEARING COATING METHOD

TECHNICAL FIELD

The present invention relates to an insulated bearing mounted at a portion having a probability of a current flowing, for example, a bearing mounted in a rotation shaft of a motor, a power generator, or the like. In addition, the present invention relates to a coating method of coating at least one of an outer ring and an inner ring of the insulated bearing with an insulating layer, specifically, to a coating method of allowing formation of an insulating layer which is excellent in electrolytic corrosion resistance and thermal conductivity.

BACKGROUND ART

In the related art, in a device including a rotation body, a metal bearing is mounted in a rotation shaft in order to reduce frictional resistance which occurs by rotation of the rotation body. For example, a bearing is also mounted in a rotation shaft of a rotation body in a motor for rotating the rotation body (so-called rotor) by using an electromagnetic force or in a power generator for rotating a rotation body (so-called turbine) by water power and the like, so as to generate power.

In the motor, the power generator, or the like, there is a problem in that a current leaks into the bearing and corrosion (referred to as electrolytic corrosion) occurring by flowing of the current easily proceeds. Thus, a technology for preventing an occurrence of electrolytic corrosion in a bearing is examined.

For example, Patent Document 1 discloses a technology in which any of an outer ring and an inner ring which are made of metal and are disposed at concentricity of a bearing is coated with a sprayed ceramic layer, so as to perform electrical insulation, and thus a flow of a current is blocked and electrolytic corrosion is prevented. In this technology, thermal spraying is performed by using a powder mixture in which powder of titania ($TiO_2$), silica ($SiO_2$), and chromium oxide ($CrO_2$) is mixed to powder of alumina ($Al_2O_3$), and sealing treatment is further performed so as to form an insulating layer. That is, the technology is as follows. A mixture having a low melting point is mixed, and thus a gap in an insulating layer of alumina ($Al_2O_3$) which is the main raw material is filled. Thus, porosity is reduced and variation thereof is suppressed, and thus stable insulating properties (that is, electrolytic corrosion resistance) for a bearing are obtained.

However, in the technology disclosed in Patent Document 1, the thickness of the insulating layer is required to be equal to or more than 250 µm for ensuring necessary insulating performance and coating strength. As a result, there is a problem in that thermal conductivity of the bearing is degraded. If the thermal conductivity is degraded, heat generated by frictional resistance occurring by rotation is accumulated in the bearing, and this is the cause of reducing the lifespan of the bearing. In a case where an insulating layer is formed by thermal spraying so as to be thick, there is a problem in that an operation period becomes longer and manufacturing cost of a bearing is increased.

That is, a technology of manufacturing a bearing which includes an insulating layer having high coating strength, and good electrolytic corrosion resistance and thermal conductivity at low price is not established yet.

RELATED ART REFERENCE

Patent Document

Patent Document 1: Japanese Patent No. 5025190

SUMMARY OF THE INVENTION

Problems to be Solved by the Invention

To solve the problem in the related art, an object of the present invention is to provide a coating method of a bearing which can form an insulating layer having high strength and good electrolytic corrosion resistance and thermal conductivity, at low price, and to provide an insulated bearing which can maintain good electrolytic corrosion resistance and thermal conductivity for a long term.

Means for Solving the Problems

The inventor examined a technology of reducing porosity of an insulating layer for improving electrolytic corrosion resistance of a bearing. The inventor found that thermal spraying was performed by using a mixture of silicon carbide powder and/or aluminum nitride powder with aluminum oxide powder, and thus a sprayed coating which had small porosity, reduced microcracks in the sprayed layer, and a high withstanding voltage was obtained.

A technology for suitably using the sprayed layer as an insulating layer of a bearing was researched for in detail. As a result, it was proved that an average particle diameter and a mixing ratio of aluminum oxide powder, silicon carbide powder, and aluminum nitride powder are adequately defined, and thus electrolytic corrosion resistance sufficient as an insulating layer of a bearing could be stably ensured at a relatively thin coating thickness. The insulating layer contains a material having thermal conductivity higher than that of aluminum oxide in the related art, and the coating thickness is thin. Accordingly, thermal conductivity is also good. Since the coating thickness is thin, it is possible to reduce a working period for thermal spraying, and reduce an amount of the consumed spraying material, and this contributes to reduction of manufacturing cost.

The present invention has made based on such knowledge, and provides the followings.

(1) There is provided an insulated bearing which includes an outer ring and an inner ring of which at least one is made of metal, and a plurality of rolling elements which are provided between the outer ring and the inner ring, so as to be freely rolled, and in which at least one of the outer ring and the inner ring is coated with an insulating layer. The insulating layer is a mixture in which silicon carbide and/or aluminum nitride as an additive are/is dispersed in a aluminum oxide as a base matrix, and a content of the additive is 1 to 40 mass % with respect to the total amount of the mixture.

(2) In the insulated bearing of (1), the insulating layer is a thermal sprayed coating formed by using spraying material mixture powder which contains silicon carbide powder and/or aluminum nitride powder so as to be a total content of 2 to 40 mass %, and a remainder of aluminum oxide powder.

(3) In the insulated bearing of (2), the spraying material mixture powder is obtained by adding silicon carbide powder having an average particle diameter of 2 μm or more and less than 5 μm and/or aluminum nitride powder having an average particle diameter of 2 μm or more and less than 5 μm, to aluminum oxide powder having an average particle diameter of 15 μm or more and less than 25 μm so as to be a total content of 2 to 20 mass %.

(4) In the insulated bearing of (2), the spraying material mixture powder is obtained in a manner that silicon carbide powder having an average particle diameter of 2 μm or more and less than 5 μm and/or aluminum nitride powder having an average particle diameter of 2 μm or more and less than 5 μm are added to aluminum oxide powder having an average particle diameter of 1 μm or more and less than 5 μm so as to be a total content of 2 to 20 mass %, and be granulated by a spray dryer.

(5) In the insulated bearing of any one of (1) to (4), the coating thickness of the insulating layer is 50 μm to 250 μm.

(6) There is provided a coating method for a bearing in which at least one of an outer ring and an inner ring which are concentrically disposed is made of metal and is coated with an insulating layer.

The method includes performing thermal spraying by using a spraying material mixture powder obtained by adding silicon carbide powder having an average particle diameter of 2 μm or more and less than 10 μm and/or aluminum nitride powder having an average particle diameter of 2 μm or more and less than 10 μm to aluminum oxide powder having an average particle diameter of 1 μm or more and less than 30 μm, so as to be a total content of 2 to 40 mass %, to form the insulating layer on the outer ring and/or the inner ring.

(7) In the coating method for a bearing of (6), the thermal spraying is performed in a manner of plasma spraying.

(8) In the coating method for a bearing of (6) or (7), the spraying material mixture powder is obtained by adding silicon carbide powder having an average particle diameter of 2 μm or more and less than 5 μm and/or aluminum nitride powder having an average particle diameter of 2 μm or more and less than 5 μm to aluminum oxide powder having an average particle diameter of 15 μm or more and less than 25 μm, so as to be a total content of 2 to 20 mass %.

(9) In the coating method for a bearing of (6) or (7), the spraying material mixture powder is obtained in a manner that silicon carbide powder having an average particle diameter of 2 μm or more and less than 5 μm and/or aluminum nitride powder having an average particle diameter of 2 μm or more and less than 5 μm are added to aluminum oxide powder having an average particle diameter of 1 μm or more and less than 5 μm so as to be a total content of 2 to 20 mass %, and be granulated by a spray dryer.

(10) In the coating method for a bearing of any one of (6) to (9), the coating thickness of the insulating layer is set to be 50 μm to 250 μm.

The "average particle diameter" of raw material powder of each spraying material in the present invention means a value of $D_{50}$ measured by a laser diffraction and scattering method.

Advantages of the Invention

According to the coating method of the present invention, it is possible to form an insulating layer which has good electrolytic corrosion resistance and thermal conductivity, and high strength; at low price. The insulated bearing according to the present invention is coated with an insulating layer which has good electrolytic corrosion resistance and thermal conductivity, and high strength, and thus can maintain excellent insulating performance for a long term. As described above, the present invention shows industrially significant effects.

MODES FOR CARRYING OUT THE INVENTION

Figure 1:
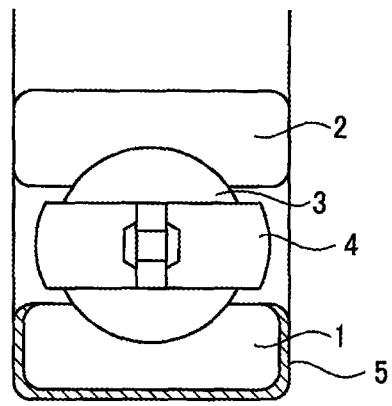
FIG. 1 is a cross-sectional view illustrating an example (in which an insulating layer is formed onto an outer ring) of an insulated bearing according to the present invention.
Figure 2:
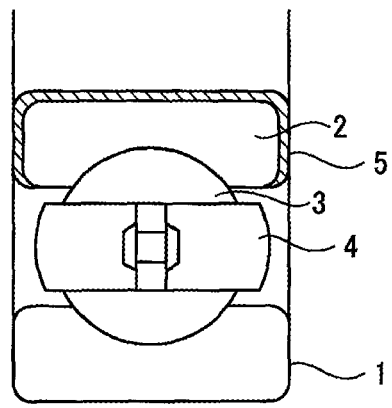
FIG. 2 is a cross-sectional view illustrating another example (in which an insulating layer is formed onto an inner ring) of the insulated bearing according to the present invention.
Figure 3:
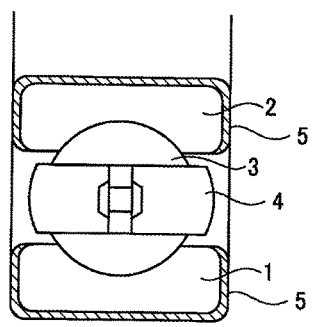
FIG. 3 is a cross-sectional view illustrating still another example (in which an insulating layer is formed onto both of the outer ring and the inner ring) of the insulated bearing according to the present invention.

An insulated bearing (also simply referred to as "a bearing" below) according to the present invention is an object in which an outer ring and an inner ring are made of metal, and an insulating layer is formed onto at least one of the outer ring and the inner ring by thermal spraying. That is, as illustrated in FIG. 1, an outer ring 1 and an inner ring 2 are concentrically disposed, and a plurality of rolling elements 3 between the outer ring 1 and the inner ring 2 is held through a holder 4 so as to be freely rolled. An insulating layer 5 is formed onto an outer circumferential surface of the outer ring 1. In addition, as illustrated in FIG. 2, the insulating layer 5 may be formed onto an inner circumferential surface of the inner ring 2. As illustrated in FIG. 3, the insulating layer 5 may be formed onto both of the outer circumferential surface of the outer ring 1 and the inner circumferential surface of the inner ring 2. The outer ring 1 and the inner ring 2 are preferably formed of bearing steel, carburized steel, or the like. The type of a bearing is not limited to a ball bearing as illustrated in the drawings, and various rolling bearings may be set as targets.

A coating method of the insulating layer 5 will be described below.

Powder used as a material for thermal spraying uses aluminum oxide powder as the main component. If particles of aluminum oxide powder are too large, pores easily occur in an insulating layer formed by thermal spraying, and this causes degradation of electrolytic corrosion resistance. Thus, the average particle diameter of aluminum oxide powder is set to be 1 μm or more and less than 30 μm. If particles of aluminum oxide powder are too small, when thermal spraying is performed, the particles are scattered to the surroundings. Thus, a working environment becomes worse, and it takes a long period to obtain an insulating layer having a predetermined coating thickness. Thus, the average particle diameter of aluminum oxide powder when a powder mixture is used as a spraying material is preferably in a range of 15 μm or more less than 25 μm.

The aluminum oxide powder is powder which contains 99.9 mass % or more of $Al_2O_3$. The remainder is impurities which are unavoidably mixed in a manufacturing process thereof. The powder is better as the amount of the impurities is reduced.

Silicon carbide powder and/or aluminum nitride powder are/is added to the aluminum oxide powder. The aluminum oxide powder is white. Thus, in a case where thermal spraying is performed only by using the aluminum oxide powder, a white insulating layer is formed onto an outer ring or an inner ring of a bearing. This has a problem in that stain occurring by using the bearing is clearly shown. On the contrary, in the present invention, a powder mixture obtained by adding silicon carbide powder and/or aluminum nitride powder to aluminum oxide powder is used. Thus, a gray insulating layer is formed and this has an advantage in that stain is unnoticed.

Silicon carbide powder added to aluminum oxide powder is powder which 98 mass % or more of SiC. The remainder is impurities which are unavoidably mixed in a manufacturing process thereof. Aluminum nitride powder is powder which contains 98 mass % or more of AlN. The remainder is impurities which are unavoidably mixed in a manufacturing process thereof. The powder is better as the amount of the impurities is reduced.

The silicon carbide powder and the aluminum nitride powder may be singly added to aluminum oxide powder or both of the silicon carbide powder and the aluminum nitride powder may be added to the aluminum oxide powder. A case where an added amount of silicon carbide powder and/or aluminum nitride powder occupying in a powder mixture is too much means that an amount of aluminum oxide powder in the powder mixture is decreased. Thus, it is difficult to ensure sufficient electrolytic corrosion resistance required for the insulating layer. If the added amount of silicon carbide powder and/or aluminum nitride powder is too small, an insulating layer which has an effect of improving abrasion resistance and an effect of improving thermal conductivity is not obtained.

That is, as shown in the following Table 1, hardness of silicon carbide powder or aluminum nitride powder is higher than hardness of an insulating layer obtained by using only aluminum oxide powder as a spraying material. Thus, silicon carbide powder or aluminum nitride powder is added, and thus it is possible to improve abrasion resistance of an insulating layer and to thin a coating thickness of the insulating layer. If the insulating layer is formed to be thin, for example, an effect of reducing a used amount of a powder mixture to be used as a material for thermal spraying, and an effect of reducing a required period for thermal spraying are obtained. Thus, the thin insulating layer contributes to reduction of manufacturing cost of a bearing.

TABLE 1

|  | Vickers hardness (HV) |
| --- | --- |
| Al$_2$O$_3$ insulating layer | 900~1100 |
| SiC powder | 2000~3000 |
| AlN powder | 1000~2000 |

Figure 4:
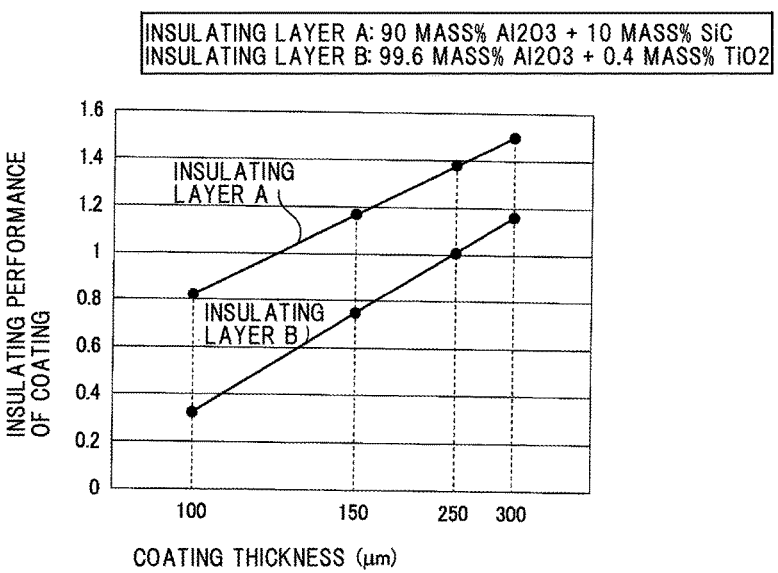
FIG. 4 is a graph obtained by comparing an insulating layer obtained by thermal spraying a powder mixture of aluminum oxide and silicon carbide to an insulating layer obtained by thermal spraying a powder mixture of aluminum oxide and titanium oxide, in insulating performance against a coating thickness.

FIG. 4 illustrates a graph obtained by comparing an insulating layer A obtained by thermal spraying a powder mixture of aluminum oxide and silicon carbide to an insulating layer B obtained by thermal spraying a powder mixture of aluminum oxide and titanium oxide, in insulating performance against a coating thickness. In a case where the layers are compared at the same coating thickness, the insulating layer A has insulating performance excellent more than that of the insulating layer B. Thus, for obtaining insulating performance (indicated as being 1.0) required as an insulated bearing, the insulating layer B is required to have a coating thickness of 250 μm, but the insulating layer A can have a coating thickness which is reduced to be about 130 μm. The insulating layer B is a mimetic object of the insulating layer used in Patent Document 1.

In addition, the silicon carbide powder or the aluminum nitride powder has thermal conductivity higher than that of aluminum oxide powder. Thus, this contributes to improvement of thermal conductivity of the insulating layer. Volume resistivity is large, and insulating performance is also excellent. Specifically, as shown in Table 2, in both of the silicon carbide powder and the aluminum nitride powder, thermal conductivity is equal to or higher than 150 W/m·K, volume resistivity is equal to or higher than 1×10$^{14}$ Ω·cm. That is, volume resistivity equivalent to that of aluminum oxide is provided at thermal conductivity higher than that of aluminum oxide.

TABLE 2

|  | Aluminum oxide powder | Silicon carbide powder | Aluminum nitride powder |
| --- | --- | --- | --- |
| Thermal conductivity | 30 W/m · K | 270 W/m · K | 150 W/m · K |
| Volume resistivity | 1 × 10$^{14\text{-}15}$ Ω · cm | 1 × 10$^{14\text{-}15}$ Ω · cm | 1 × 10$^{14\text{-}15}$ Ω · cm |
| Melting point | 2072° C. | 2545° C. | 2150° C. |

Thus, in a case where the silicon carbide powder or the aluminum nitride powder is singly added, a proportion of the added powder occupying in a powder mixture is set to be in a range of 2 to 40 mass %. Preferably, the proportion thereof is 2 to 20 mass %. More preferably, the proportion thereof is 10 to 20 mass %. In a case where both of the silicon carbide powder and the aluminum nitride powder are added, the total proportion of the silicon carbide powder and the aluminum nitride powder occupying in a powder mixture is set to be in a range of 2 to 40 mass %. Preferably, the total proportion thereof is 2 to 20 mass %. More preferably, the total proportion thereof is 10 to 20 mass %.

If particles of the silicon carbide powder or the aluminum nitride powder are too large, pores easily occur in an insulating layer formed by thermal spraying, and this causes degradation of electrolytic corrosion resistance. Thus, the average particle diameter of any of the silicon carbide powder and the aluminum nitride powder is set to be less than 10 μm. If particles of the silicon carbide powder or the aluminum nitride powder are too small, an effect of improving abrasion resistance of the insulating layer is not obtained. Thus, the average particle diameter of any of the silicon carbide powder and the aluminum nitride powder is preferably in a range of 2 μm or more and less than 5 μm.

When thermal spraying is performed by such a powder mixture, a plasma jet is preferably used. Thermal spraying using a plasma jet (referred to as plasma spraying below) is performed, and thus an insulating layer can be formed in a manner that aluminum oxide powder is selectively melted, and silicon carbide powder or aluminum nitride powder is not melted with a relationship between a temperature of a plasma jet and melting points of the aluminum oxide powder, the silicon carbide powder, and the aluminum nitride powder. Accordingly, an effect of improving abrasion resistance and thermal conductivity of an insulating layer is exhibited.

In plasma spraying, it is known that the aluminum oxide powder is melted, and then the melted aluminum oxide powder is rapidly cooled, and thus multiple microcracks (crack having a width of 0.5 μm or less when a cross section is observed) occur in crystal grains of aluminum oxide obtained by solidifying. However, in the present invention, since plasma spraying is performed by using a powder mixture which is obtained by adding silicon carbide powder or aluminum nitride powder having high thermal conductivity, it is possible to reduce a time required for solidification. As a result, solidification can be finished before a microcrack occurs, and it is possible to form an insulating layer having no microcrack. Thus, in the present invention, even when plasma spraying is performed, microcracks hardly occur in an insulating layer. "Hardly occurring" herein means that a proportion (that is, an area ratio) of the total area of portions corresponding to microcracks, to the entirety of the area of an insulating layer when a cross section is observed is equal to or less than 5.0%.

At a time of being melted, silicon carbide and aluminum nitride in the spraying material is not melted, and only aluminum oxide is in a melted state. Thus, silicon carbide and/or aluminum nitride in a state of particles are/is dispersed in melt of aluminum oxide. In addition, silicon carbide and aluminum nitride do not perform a chemical reaction with aluminum oxide, and silicon carbide, aluminum nitride, and aluminum oxide are simply in a physically mixed state. Thus, an insulating layer formed in this manner is a mixture in which silicon carbide and/or aluminum nitride as an additive are/is substantially uniformly dispersed in aluminum oxide as a base matrix. Regarding the amount of silicon carbide and/or aluminum nitride, an original mixed state as described above is maintained. However, a case where a portion thereof scatters at a time of thermal spraying and thus is not included in an insulating layer is also considered. Thus, in the present invention, the amount of silicon carbide and/or aluminum nitride in an insulating layer is set to be in a range of 1 to 40 mass % based on the prospect of being slightly smaller than that in the original mixed state.

An insulating layer formed in this manner has sufficient electrolytic corrosion resistance and coating strength at a relatively thin coating thickness. However, in a case where the coating thickness is equal to or more than 200 μm, thermal conductivity is reduced, and thus it is difficult to dissipate frictional heat generated by using a bearing. As a result, the frictional heat is accumulated in the bearing, and thus deformation, burning, and the like of the bearing easily occurs. If the insulating layer is too thin, electrolytic corrosion easily occurs in the bearing. Thus, from a viewpoint of achieving both of electrolytic corrosion resistance and thermal conductivity of an insulating layer, the coating thickness is preferably in a range of 50 μm or more and less than 200 μm.

It is preferable that, before thermal spraying, a portion to be sprayed is protected by a jig, and then roughening is performed by blasting and the like. Regarding the degree of roughening, for example, surface roughness Ra after blasting is preferably 2 to 10 μm, and more preferably 4 to 8 μm.

In the present invention, an insulating layer is formed by using a powder mixture which is obtained by adding silicon carbide powder and/or aluminum nitride powder to aluminum oxide powder. Thus, it is possible to exhibit sufficient electrolytic corrosion resistance and coating strength in the above-described range for a coating thickness. Thus, an insulating layer in which porosity is reduced and variation thereof is small is obtained. In this embodiment, it is possible to obtain an insulating layer having porosity of 1.0% to 5.0%. In addition, since thermal conductivity of the silicon carbide powder or the aluminum nitride powder is large, it is possible to sufficiently ensure thermal conductivity of an insulating layer.

Specifically, as will be described in examples which will be described later, even when the coating thickness of an insulating layer is set to be equal to or less than 200 μm, the insulating layer has electrolytic corrosion resistance which is equivalent to that of an insulating layer which is formed of only aluminum oxide and has a coating thickness of 250 μm. In addition, the insulating layer in this embodiment has coating strength of 1.3 times or more that of the above insulating layer.

In a case of obtaining an advanced insulating layer which has smaller variation, it is preferably that simply not a powder mixture but a spraying powder is produced by a granulation method, and thermal spraying is performed. Aluminum oxide powder in this case has an average particle diameter which is set to be 1 μm or more and less than 5 μm. The average particle diameter of silicon carbide powder or aluminum nitride powder to be mixed is 2 μm or more and less than 5 μm. The powder is mixed with an organic polymer binding material and pure water, so as to generate a slurry. Then, granulation is performed by using a spray dryer and the like, and firing is performed.

Further, the coating thickness of an insulating layer is set to be relatively thin as described above, and thus it is possible to achieve both of good electrolytic corrosion resistance and thermal conductivity at high strength. Thus, it is possible to reduce a required period for thermal spraying, and to reduce a used amount of a powder mixture as a material for thermal spraying. As a result, it is possible to reduce manufacturing cost of a bearing. An effect of allowing omission of sealing treatment also contributes to reduction of manufacturing cost.

After an insulating layer is formed, sealing treatment may be performed by using a sealing material. In the sealing treatment, for example, a bearing having an insulating layer formed thereon may be immersed in a solution (sealing material solution) containing a sealing material or may be coated with a sealing material solution by spray coating, and then may be dried. The sealing material may be selected from epoxy resin-based sealing materials, silicone resin-based sealing materials, and silica-based sealing materials. As the silica-based sealing material, sodium silicate, ethyl silicate, and the like may be used.

EXAMPLES

Example 1

Before an insulating layer is formed by plasma spraying, a test piece of a bearing is cleaned and degreased by using an organic solvent, and then a non-spraying portion is protected by a jig and roughening is performed by blasting.

Plasma spraying was performed by using a powder mixture which was obtained by adding silicon carbide powder having an average particle diameter of 3 μm to aluminum oxide powder having an average particle diameter of 20 μm. Thus, an insulating layer (coating thickness of 150 μm) was formed onto the outer circumferential surface of an outer ring in a bearing. The proportion of the silicon carbide powder occupying in the powder mixture was set to 20 mass %. The average particle diameter is a value of $D_{50}$ measured by a laser diffraction and scattering method with MICROTRAC MT3300 manufactured by Nikkiso Co., Ltd.

(similar in the following examples). Then, sealing treatment was performed. This is set as an invention example.

By the contrary, as a comparative example, plasma spraying was performed by using aluminum oxide powder having an average particle diameter of 20 μm, and an insulating layer (coating thickness of 150 μm) was formed onto an outer surface of an outer ring in a bearing. Similarly, sealing treatment was performed.

Table 3 shows results obtained by measuring volume resistivity and a dielectric breakdown voltage of the above bearings. The volume resistivity was measured based on JIS standards K6911, and the dielectric breakdown voltage was measured based on JIS standards C2110-2.

TABLE 3

| Type of insulating layer | Volume resistivity | Dielectric breakdown voltage (coating thickness of 150 μm) | Note |
|---|---|---|---|
| Aluminum oxide | $3.3 \times 10^{14}$ $\Omega \cdot cm$ | 4.1 kV | Comparative Example |
| Aluminum oxide + silicon carbide | $7.8 \times 10^{14}$ $\Omega \cdot cm$ | 7.8 kV | Invention Example |

As clear from Table 3, the invention example had better volume resistivity and dielectric breakdown voltage.

Further, when a cross section of the insulating layer was observed by a scanning electron microscope (magnification: 350 times), a microcrack was not recognized in the invention example. However, in the comparative example, multiple microcracks occurred.

Example 2

A ratio of silicon carbide and/or aluminum nitride to be mixed with aluminum oxide was changed, and then comparison of dielectric breakdown voltage, thermal conductivity, and cost was conducted. Before an insulating layer was formed by plasma spraying, a test piece was cleaned and degreased by using an organic solvent, and then roughening was performed by blasting.

Plasma spraying was performed by using a powder mixture and powder. The powder mixture was obtained by adding silicon carbide powder and/or aluminum nitride powder having an average particle diameter of 3 μm to aluminum oxide powder having an average particle diameter of 20 μm at a mixing ratio shown in Table 4. The powder was obtained in a manner that aluminum oxide powder having an average particle diameter of 3 μm and silicon carbide powder having an average particle diameter of 3 μm were added at a mixing ratio shown in Table 4, and then be granulated by a spray dryer. Then, an insulating layer (coating thickness of 150 μm) was formed onto one end surface of the test piece. This is set as an invention example.

By the contrary, as a comparative example, plasma spraying was performed by using aluminum oxide powder having an average particle diameter of 20 μm, and an insulating layer (coating thickness of 250 μm) was formed onto one end surface thereof.

Table 4 shows results obtained by measuring a dielectric breakdown voltage and thermal conductivity of the above test pieces. The dielectric breakdown voltage was measured based on HS standards C2110-2, and thermal conductivity was measured by using a sprayed coating which had been mechanically taken out, and by using a laser flash method. Cost in Comparative Example 2 was set to 1, and cost was calculated based on material cost and a processing period by a ratio. The calculated cost was compared in Table 4.

TABLE 4

| | Powder mixing ratio (mass %) | | | Thickness of thermal sprayed coating (μm) | Dielectric breakdown voltage (kV) | Thermal conductivity (W/m · K) | Cost ratio | Note |
|---|---|---|---|---|---|---|---|---|
| | Aluminum oxide | Silicon carbide | Aluminum nitride | | | | | |
| Mixture | 100 | 0 | 0 | 150 | 4.1 | 30 | 0.9 | Comparative Example 1 |
| | 100 | 0 | 0 | 250 | 8.8 | 30 | 1.0 | Comparative Example 2 |
| | 98 | 2 | 0 | 150 | 6.2 | 35 | 0.7 | Invention Example 1 |
| | 90 | 10 | 0 | 150 | 7.3 | 56 | 0.72 | Invention Example 2 |
| | 80 | 20 | 0 | 150 | 9.4 | 74 | 0.75 | Invention Example 3 |
| | 60 | 40 | 0 | 150 | 6.5 | 130 | 0.8 | Invention Example 4 |
| | 98 | 0 | 2 | 150 | 5.8 | 31 | 0.8 | Invention Example 5 |
| | 80 | 10 | 10 | 150 | 8.0 | 55 | 0.72 | Invention Example 6 |
| | 60 | 20 | 20 | 150 | 6.8 | 70 | 0.75 | Invention Example 7 |
| Granulated powder | 90 | 10 | 0 | 150 | 9.0 | 75 | 1.1 | Invention Example 8 |
| | 80 | 20 | 0 | 150 | 10.0 | 90 | 1.2 | Invention Example 9 |

As clear from Table 4, in the invention example, the better results in insulating characteristics and thermal conduction were obtained in any combination. However, it is difficult to achieve both of insulating characteristics and thermal conduction, and it is desired that a mixing ratio is determined in accordance with required quality.

Example 3

The coating thickness of an insulating layer was changed, and then comparison of insulating performance, coating strength, and cost was conducted. Before an insulating layer was formed by plasma spraying, a test piece was cleaned and degreased by using an organic solvent, and then roughening was performed by blasting.

Plasma spraying was performed by using a powder mixture which was obtained by adding silicon carbide powder and/or aluminum nitride powder having an average particle diameter of 3 μm to aluminum oxide powder having an average particle diameter of 20 μm at a mixing ratio shown in Table 5. Then, an insulating layer having a coating thickness shown in Table 5 was formed onto one end surface of the test piece. This is set as an invention example.

By the contrary, as a comparative example, plasma spraying was performed by using aluminum oxide powder having an average particle diameter of 20 μm, and an insulating layer having a coating thickness of 200 μm or 250 μm was formed onto one end surface thereof.

The dielectric breakdown voltages of the above test pieces were measured, and cost was calculated based on material cost and a processing period. A drop ball impact test was performed, and thus the coating strength of the insulating layer was measured. Table 5 shows results obtained by comparing to a test piece which is formed of aluminum oxide and has a coating thickness of 250 μm as an insulating layer, regarding the above items.

TABLE 5

Coating thickness and coating characteristics of insulating layer

| Powder mixing ratio (mass %) | | | Thickness of thermal sprayed coating (μm) | Insulating performance of bearing | Strength ratio of coating | Cost ratio | Note |
| --- | --- | --- | --- | --- | --- | --- | --- |
| Aluminum oxide | Silicon carbide | Aluminum nitride | | | | | |
| 100 | 0 | 0 | 200 | 0.4 | 1.3 | 0.9 | Comparative Example 3 |
| 100 | 0 | 0 | 250 | 1.0 | 1.0 | 1.0 | Comparative Example 4 |
| 90 | 10 | 0 | 200 | 1.0 | 1.5 | 0.7 | Invention Example 10 |
| 90 | 0 | 10 | 200 | 1.0 | 1.4 | 0.7 | Invention Example 11 |
| 80 | 20 | 0 | 250 | 2.0 | 1.3 | 0.9 | Invention Example 12 |
| 80 | 20 | 0 | 150 | 1.0 | 2.2 | 0.6 | Invention Example 13 |

As clear from Table 5, in the invention example, even when the coating thickness of the insulating layer is thinned so as to be equal to or less than 200 μm, insulating performance which is equivalent to that in the comparative example in which the coating thickness is set to 250 μm is obtained. In the invention example, if the coating thickness of the insulating layer is thick to be 250 μm, insulating performance which is twice that in the comparative example in which the coating thickness is set to 250 μm is obtained. Further, in the invention example, even though the insulating layer is thin to be equal to or less than 200 μm, coating strength is improved so as to be 1.3 times or more that in the comparative example in which the coating thickness is set to 250 μm. As described above, the insulating layer is allowed to be thin, and thus low cost is obtained.

In the embodiment, the "average particle diameter" of raw material powder of each spraying material means a value of $D_{50}$ measured by a laser diffraction and scattering method. The average particle diameter is measured by using MICROTRAC MT3300 manufactured by Nikkiso Co., Ltd.

The present invention is described with reference to the detailed specific embodiment. However, various changes or modifications may be made in a range without departing from the gist and the scope of the present invention, and this is apparent by the skilled person in the art.

This application is based upon Japanese Patent Application No. 2014-2559918 filed Dec. 24, 2014, and Japanese Patent Application No. 2015-178532 filed Sep. 10, 2015; the entire contents of which are incorporated herein by reference.

INDUSTRIAL APPLICABILITY

An insulated bearing in the present invention has an inner ring or an outer ring which is coated with a specific thermal sprayed coating, and thus has excellent electrolytic corrosion resistance and thermal conductivity. Particularly, the insulated bearing is suitably used in a motor, a power generator, and the like.

DESCRIPTION OF REFERENCE NUMERALS AND SIGNS

1 OUTER RING
2 INNER RING
3 ROLLING ELEMENT
4 HOLDER
5 INSULATING LAYER

The invention claimed is:
1. An insulated bearing comprising:
an outer ring and an inner ring of which at least one is made of metal; and
a plurality of rolling elements which are provided between the outer ring and the inner ring, so as to be freely rolled,
wherein at least one of the outer ring and the inner ring is coated with an insulating layer, and
wherein the insulating layer is a mixture in which silicon carbide and/or aluminum nitride as an additive are/is dispersed in aluminum oxide as a base matrix, and a content of the additive is 1 to 40 mass % with respect to the total amount of the mixture.
2. The insulated bearing according to claim 1,
wherein the insulating layer is a thermal sprayed coating formed by using a spraying material mixture powder which contains silicon carbide powder and/or aluminum nitride powder so as to be a total content of 2 to 40 mass %, and a remainder of aluminum oxide powder.
3. The insulated bearing according to claim 2,
wherein the spraying material mixture powder is obtained by adding silicon carbide powder having an average particle diameter of 2 μm or more and less than 5 μm and/or aluminum nitride powder having an average particle diameter of 2 μm or more and less than 5 μm, to aluminum oxide powder having an average particle diameter of 15 μm or more and less than 25 μm so as to be a total content of 2 to 20 mass %.
4. The insulated bearing according to claim 2,
wherein the spraying material mixture powder is obtained by adding silicon carbide powder having an average particle diameter of 2 μm or more and less than 5 μm and/or aluminum nitride powder having an average particle diameter of 2 μm or more and less than 5 μm to aluminum oxide powder having an average particle diameter of 1 μm or more and less than 5 μm so as to be a total content of 2 to 20 mass %, and the spraying material mixture powder is granulated by a spray dryer.

5. The insulated bearing according to claim 1, wherein a coating thickness of the insulating layer is 50 µm to 250 µm.

* * * * *